Feb. 2, 1965 L. H. SANDSTROM 3,167,968
TUNING MECHANISM
Filed Dec. 4, 1962
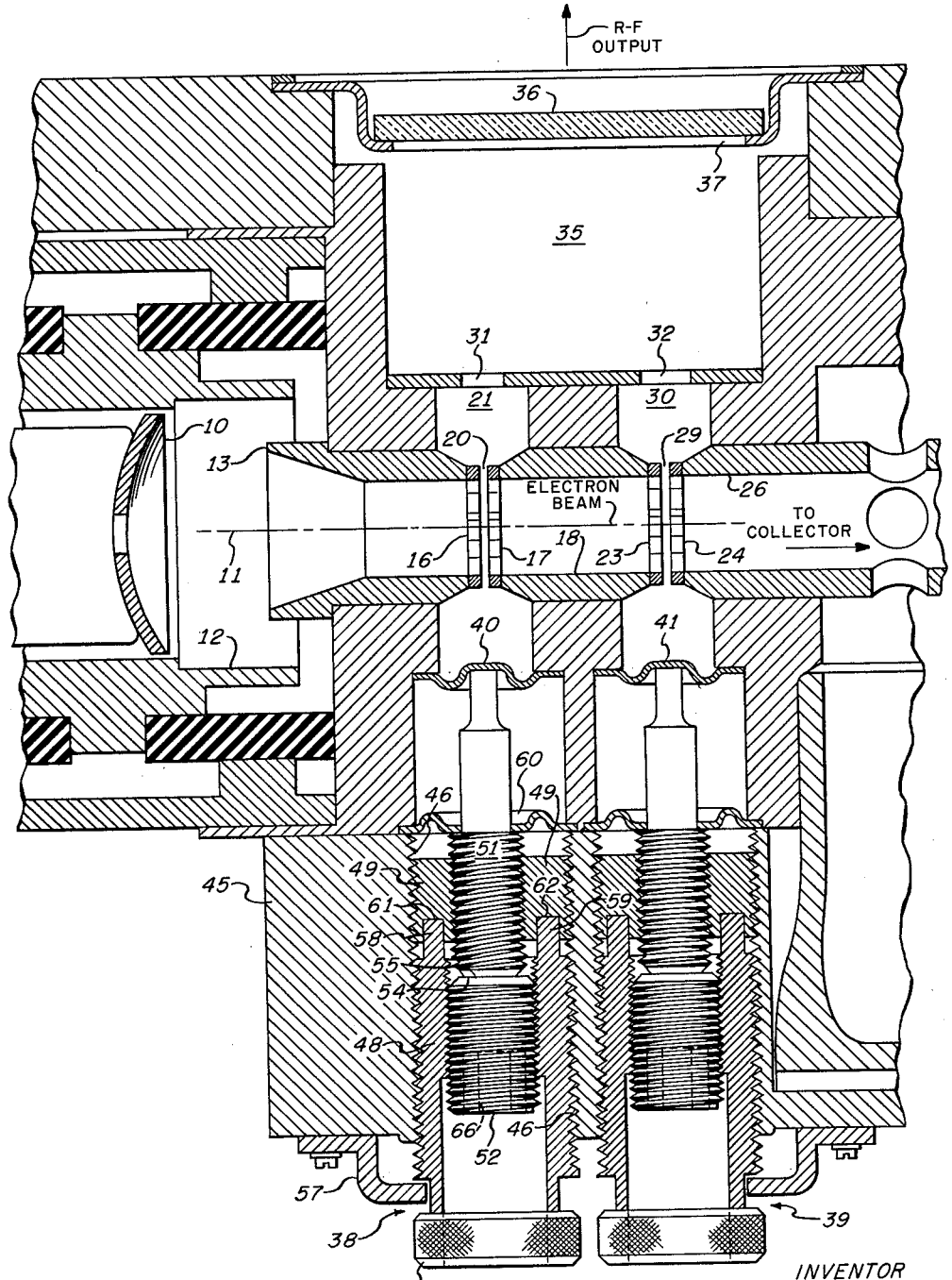
INVENTOR
LARS H. SANDSTROM
BY John H. Gallagher
ATTORNEY

3,167,968
TUNING MECHANISM
Lars H. Sandstrom, Gainesville, Fla., assignor to Sperry Rand Corporation, Great Neck, N.Y., a corporation of Delaware
Filed Dec. 4, 1962, Ser. No. 242,249
5 Claims. (Cl. 74—424.8)

This invention relates to a tuning mechanism useful for tuning a cavity resonator of an electronic tube device, and more particularly relates to a differential screw mechanism capable of being bound in position yet readily adjustable for fine tuning.

Electronic tubes such as klystrons commonly are tuned in frequency by deflecting a flexible wall of a cavity resonator. The mechanism to accomplish this tuning must be capable of imparting very small displacements to the flexible wall in order to accomplish fine frequency tuning, the mechanism must be mechanically rugged, and particularly in tubes operating in the higher microwave frequencies where the physical structures of the tubes are very small, the tuning mechanisms must be substantially free from vibrations and jitter, or any loose motion in order not to affect the frequency of operation of the tube. A differential screw tuning mechanism has the ability to impart small displacements to the flexible wall, and may be relatively rugged, but because of the threaded engagements of its various members, the ordinary differential screw is subject to loose motion, and is not readily locked in position without disturbing the tuning, this then requiring that the differential screw mechanism be unlocked and further adjustments made until the desired frequency of operation is obtained.

It is an object of the persent invention to provide a rugged and precise tuning mechanism capable of being locked in a fixed position.

It is another object of this invention provide a differential screw mechanism having locking means for holding said mechanism in a fixed position yet readily permitting fine adjustment of said mechanism.

A further object of this invention is to provide a rugged and precise klystron tuner for use in environments of heavy vibration, shock and acceleration.

In accordance with the present invention, fine tuning of a cavity resonator of a klystron tube is accomplished by means of a tuning mechanism comprised of a fixed body member secured to the tube body and having a threaded bore extending therethrough along an axis transverse to the central tube axis. First and second externally and internally threaded nuts are axially disposed within, and in threaded engagement with said bore. First and second externally threaded screws or shafts each are threadably engaged with a respective one of said nuts and are adapted to make a butting contact with each other at their adjacent ends. The other end of the first one of said screws is secured in a non-rotatable manner to a flexible wall of a cavity resonator in the tube, and the other end of the second screw is adapted to receive a tool to independently rotate said second screw within the second nut. Means are provided to join the two nuts together so that they are rotatable together with no relative roation between them, and so that they are axially movable, or translatable with respect to each other. The two nuts are rotated together to impart an axial movement to the first screw, and thus to the flexible wall secured thereto. When the wall has been deflected to produce the desired resonant frequency in the resonant cavity, the second screw is turned in against the first screw to make a butting contact and bind all the threaded engagements of the screws with the nuts, and the nuts with the bore. Further fine adjustment is accomplished, if necessary, by the rotation of the nuts and then locking with the second screw, as before.

Referring now to the sole illustration, the figure is a partial sectional view of a klystron tube oscillator wherein the details of the cathode assembly and collector assembly, both of conventional designs, have been omitted. As illustrated in the figure, electrons from electron emissive surface 10 are formed into a central beam 11 with the aid of focussing electrode 12 and accelerating anode 13. Electron permeable grids 16 and 17, respectively fixed to adjacent ends of anode 13 and drift tube 18, form a gap 20 within the first reentrant cavity resonator 21. In a similar manner, electron permeable grids 23 and 24, respectively fixed to adjacent ends of drift tube 18 and collector electrode 26, form a second gap 29 within the second cavity resonator 30. Coupling apertures 31 and 32 provide means for coupling electromagnetic energy to the section of output waveguide 35 and also provide feedback coupling of electromagnetic energy from cavity resonator 30 to cavity resonator 21. A dielectric output window 36 provides a vacuum seal across the output aperture 37 of the tube.

The respective cavity resonators 21 and 30 are provided with flexible side wall portions 40 and 41 which are formed from thin, resilient metallic sheets which may be flexed inwardly or outwardly to vary the internal volume of the resonators, and thus vary the resonant frequency of the resonators. This type of volume tuning of klystron cavities is well known to those skilled in the art and will not be further described.

The tuning mechanisms 38 and 39 for varying the positions of flexible walls 40 and 41 constitute the invention claimed hereinbelow, and since the two mechanisms are identical to each other, only tuner 38 will be described. The tuning mechanism is comprised of a fixed body portion 45 which is rigidly secured to the tube body, as by brazing. Fixed body portion 45 has a uniformly threaded bore 46 extending therethrough, and two axially-spaced nuts 48 and 49, both of which are externally and internally threaded, threadably engage the threaded bore 46. Externally threaded screw or shaft 51 is secured to flexible side wall 40 of resonator 21 in a non-rotatable manner, as by brazing, and threadably engages the internal threads of nut 49. A second threaded screw or shaft 52 threadably engages the internal threads of the second nut 48 and is independently rotatable within nut 48. Shaft 52 has a flat, blunt end 54 which is adapted to make a firm butting contact against the similar flat, blunt end 55 of non-rotatable shaft 51.

The pitch and/or direction of the external threads of nut 49 and the threads of bore 46 are different from the pitch and/or direction of the internal threads of nut 49 and from the threads of shaft 51 so that the nut 49 and shaft 51 form a differential screw mechanism of a known type commonly used to achieve fine axial displacement without having to resort to fine delicate threads that will not withstand wear and pressure. A similar relationship exists between the threads of bore 46, nut 48 and shaft 52 so that this combination also forms a differential screw mechanism.

In the assembled relationship of the various members, as illustrated in the figure, nuts 48 and 49 are joined together by means of stubs or blades 58 and 59 which extend from nut 48 and are freely received within mating recesses 61 and 62 in nut 49. Thus, in their assembled positions within bore 46, nuts 48 and 49 are rotatable together, but are axially movable, or translatable, with respect to each other, within the limits of the freedom of axial motion permitted by the looseness of fit of the respective threads.

To facilitate the turning of nuts 48 and 49, knurled knob 56 is provided at the external end of nut 48. In order to prevent damage to the flexible wall 40 due to excessive axial displacement of threaded screw 51, a rigid limit stop 57 is provided. Limit stop 57 is secured to the fixed body portion 45 and extends within a recess in the externally-extending portion of nut 48, thus limiting the axial movement of nut 48. Screw 52 is provided with a hexagonal recess 66 at its left end to receive an Allen wrench, for example, for rotating screw 52 within nut 48.

A flexible diaphragm 60 may be secured between threaded screw 51 and the rigid body portion of the tube to add mechanical rigidity to the tuning mechanism and to provide a further vacuum seal.

In assemblying the tuning mechanism 38 for example, nut 49 is inserted within bore 46 and screwed in until its bottom face is about one thread within the end of bore 46. The stubs or blades 58 and 59 of the second nut 48 then are inserted within recesses 61 and 62 of nut 49 and then the two nuts are turned together until they reach the approximate position within bore 46 as illustrated in the figure wherein nut 49 is engaged with non-rotatable screw 51. Threaded screw or shaft 52 then is inserted within nut 48 and turned inwardly until contact is made between the blunt, flat surfaces 54 and 55 of the two screws 51 and 52. Threaded screw 52 then is slightly backed off to permit axial movement of the threaded screw 51 within bore 46.

To achieve the desired frequency of operation of cavity resonator 21, for example, frequency measuring and power measuring apparatus are coupled to the output waveguide 35, in accordance with known practice. Nuts 48 and 49 then are turned in unison by means of knob 56. This causes the axial movement of non-rotatable threaded screw or shaft 51 within nut 49, and thus deflecting flexible wall 40 to vary the resonant frequency of cavity resonator 21. When the desired frequency of operation is obtained, threaded screw 52 which functions as the locking screw, is turned inwardly to contact screw 51. The abutment of screw 52 against screw 51 also creates against screw 52 a counter force directly axially toward the bottom. This counter force pulls nut 48 downwardly to the extent permitted by the looseness of the threads to bind its external threads to the threads of bore 46, and also binds the external threads of screw 52 to the internal threads of nut 48. All threaded engagements of the members of the tuning mechanism now are bound to hold flexible wall 40 in a fixed position relative to fixed body member 45.

Because there will be some looseness or play in the threads of the various members, the tightening of locking screw 52 against screw 51 may cause a slight detuning of cavity resonator 21, thus requiring further fine tuning. This is accomplished by further successive rotation of nuts 48 and 49 and locking screw 52 until the desired frequency of operation is attained with all threaded contacts of the members locked in the manner previously described. In this final adjustment a considerably greater force may be required to rotate the nuts 48 and 49 because their threaded surfaces are bound by the axial forces resulting from the abutment of tuning screw 51 against screw 52.

One of the particularly advantageous features of the tuning mechanism of this invention is the addition of the second nut 48 and second screw or shaft 52. This arrangement permits the application of the axial binding force to screw 51 by locking screw 52 while still permitting the rotation of nut 49 by means of its non-rotatable engagement with nut 48, which is accessible at the left end of bore 46. If the second nut 48 were not present, there would be no means available to further adjust nut 49 after an axial binding force was applied to screw 51. In addition to this adjustment feature, the mechanism also has the feature that all threaded engagements are bound against axial movement when finally adjusted. If nuts 48 and 49 were not axially movable relative to each other, the tightening of locking screw 52 against screw 51 would not bind the external threads of nut 52 against the threads of bore 46, and since the important thing to be accomplished is to eliminate all looseness between screw 51, i.e. flexible wall 40, and fixed body member 45, the desired locking action would not be accomplished.

If desired, the fixed body portion 45 may be made of several parts having different coefficients of expansion. This type of arrangement may be utilized to accomplish temperature compensation to prevent detuning of the cavity resonators due to thermal expansion of the various members when they heat up during operation of the tube.

Tuning mechanisms 38 and 39 need not be located adjacent each other in the manner illustrated in the figure, but they may be angularly disposed about the tube central axis, if desired.

From the above description it may be seen that a tuning mechanism is provided for a cavity resonator wherein this mechanism is physically rugged and is inherently bound in position when properly adjusted, yet is readily tunable to achieve fine frequency tuning.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus for imparting an axially directed force to a non-rotatable member comprising the combination,
a body member having an axially-aligned threaded bore,
first and second differential screw mechanisms axially spaced within said bore,
each of said differential screw mechanisms comprising an internally and externally threaded nut and an axially-aligned screw threadably engaging the internal threads of its respective nut,
means for joining together the nuts of said differential screw mechanisms in a non-rotatable but axially-translatable manner with respect to each other,
means for maintaining the screw of the first one of said differential screw mechanisms in a non-rotatable relationship with respect to said bore,
the axial screw of said second differential screw mechanism being independently rotatable within its respective nut and being adapted to exert an axially directed force against the screw of said first differential screw mechanism.

2. Apparatus for imparting an axially directed force to a non-rotatable member comprising the combination,
a body member having an axially-aligned threaded bore,
said body member being fixed to said non-rotatable member,
first and second differential screw mechanisms axially spaced within said bore,
each of said differential screw mechanisms comprising a nut having internal and external threads and an axially-aligned shaft threadably engaging the internal threads of a respective nut.
means for joining together the nuts of said differential screw mechanisms in a non-rotatable but axially-translatable manner with respect to each other,
means for securing the shaft of the first one of said differential screw mechanisms to said non-rotatable member,
the axial shaft of said second differential screw mechanism being independently rotatable within its respective nut and being adapted to exert an axially directed force against the axial shaft of said first differential screw mechanism.

3. A differential screw mechanism capable of being locked in position yet adjustable for fine adjustment, said mechanism comprising, a fixed member having a threaded bore extending therethrough, first and second externally and internally threaded nuts disposed in axially-spaced relationship within said bore and each being in threaded engagment therewith, first and second externally threaded shafts each in threaded engagement with the internal threads of a respective nut, the first one of said shafts being non-rotatable with respect to said fixed member, and the second one of said shafts being independently rotatable within said second nut and adapted to exert an axially directed force against said first shaft, means for joining said two nuts in a manner to permit relative axial displacement but to prevent relative rotation therebetween, whereby said two nuts are rotatable together to axially displace said first shaft, and said second shaft is independently rotatable to exert an an axial force against said first shaft and thereby bind all the recited threaded engagements of said nuts and shafts and said bore.

4. A tuning mechanism for deflecting a wall of a cavity resonator, said mechanism comprising, rigid means fixed relative to said cavity resonator and having an internal threaded bore extending therethrough and providing access to said wall to be deflected, a threaded shaft non-rotatably secured to said cavity wall and coaxially disposed within said internally threaded bore, a nut having internal and external threads respectively engaging the threads of said shaft and said bore and adapted to rotate about said shaft, a second nut having internal and external threads and disposed in threaded engagement with said bore on the side of said first nut opposite the cavity wall, said two nuts being adapted to be secured in non-rotatable relationship with respect to each other but capable of having axial movement relative to each other within the limits permitted by their threaded engagements with said bore, and a second threaded shaft threadably engaged with the internal threads of said second nut and adapted to exert an axially directed force against said first threaded shaft, whereby the rotation of said second nut imparts an an axial displacement to said first shaft and the abutment of said second shaft against said first shaft binds all the recited threaded contacts.

5. A klystron tube tuning mechanism adapted to deflect a flexible wall of a cavity resonator of said tube, said mechanism comprising, a fixed body member fixedly positioned with respect to said tube, said body member having a threaded bore extending axially therethrough, a threaded shaft non-rotatably secured to a flexible wall of a cavity resonator of said klystron tube and extending coaxially within said bore, a nut having internal and external threads respectively engaging the threads of said shaft and said bore and adapted to rotate about said shaft, a second nut having internal and external threads and disposed in threaded engagement with said bore on the side of said first nut opposite the flexible resonator wall, means for securing said two nuts in non-rotatible relationship with respect to each other but permitting relative avial movement between said nuts within the limits permitted by their threaded engagements with said bore, and a second externally threaded shaft threadably engaged with and independently rotatable within said second nut and adapted to exert an axially directed force against said first threaded shaft, whereby the rotation of said second nut imparts a rotation to said first nut and an axial displacement to said first shaft and said flexible wall secured thereto, and the exertion of an axial force by said second shaft against said first shaft binds all the excited threaded engagements of said shafts, said nuts, and said bolts.

References Cited in the file of this patent
UNITED STATES PATENTS 2,644,908    Varian _____ July 7, 1953
3,058,042    Barnes _____ Oct. 9, 1962